(12) United States Patent
Choi et al.

(10) Patent No.: US 7,726,475 B2
(45) Date of Patent: Jun. 1, 2010

(54) MULTIPLE DISC STORAGE CONTAINER

(75) Inventors: King Yeung Choi, Hong Kong (HK);
Kwok Keung Kwong, Hong Kong (HK)

(73) Assignee: Encore Holdings Limited, Nassau (BS)

( * ) Notice: Subject to any disclaimer, the term of this patent is extended or adjusted under 35 U.S.C. 154(b) by 739 days.

(21) Appl. No.: 11/339,862

(22) Filed: Jan. 26, 2006

(65) Prior Publication Data
US 2007/0170078 A1   Jul. 26, 2007

(51) Int. Cl.
*B65D 85/57* (2006.01)
*B65D 79/00* (2006.01)
*B65D 85/30* (2006.01)

(52) U.S. Cl. .................. 206/308.1; 206/311; 206/749

(58) Field of Classification Search .............. 206/307, 206/308.1, 308.2, 311, 312, 387.13, 232, 206/472, 307.1, 736, 743, 745, 747–749, 206/759, 766, 45.23; 402/5, 19, 80 P, 500; 40/388, 390, 405; 16/234, 260, 267, 269, 16/261, 270, 365, 366, 370; 211/40, 41.12; 220/520

See application file for complete search history.

(56) References Cited

U.S. PATENT DOCUMENTS

| 4,844,260 | A | * | 7/1989 | Jaw ........................ 206/308.3 |
| 5,176,250 | A | * | 1/1993 | Cheng ........................ 206/748 |
| 5,322,162 | A | * | 6/1994 | Melk ........................ 206/310 |
| 5,407,067 | A | * | 4/1995 | Cotter et al. ................. 206/312 |
| 5,695,054 | A | * | 12/1997 | Weisburn et al. .......... 206/308.1 |
| 5,697,498 | A | * | 12/1997 | Weisburn et al. .......... 206/308.1 |
| 5,762,246 | A | * | 6/1998 | Drew ........................ 224/312 |
| 5,792,246 | A | * | 8/1998 | Nishiguchi .................... 96/177 |
| 5,845,771 | A | * | 12/1998 | Fu ........................ 206/308.1 |
| 5,996,785 | A | * | 12/1999 | Palmer et al. ............. 206/308.1 |
| 6,024,215 | A | * | 2/2000 | Leung ..................... 206/308.1 |
| 6,554,132 | B2 | * | 4/2003 | Lau ............................. 206/303 |
| 7,353,941 | B2 | * | 4/2008 | Boland .................... 206/308.1 |
| 2002/0014421 | A1 | * | 2/2002 | Byrne et al. ............. 206/308.1 |
| 2005/0241970 | A1 | * | 11/2005 | Choi ........................ 206/308.1 |
| 2005/0274636 | A1 | * | 12/2005 | Choi ........................ 206/308.1 |
| 2007/0114147 | A1 | * | 5/2007 | Libohova ................. 206/308.1 |

* cited by examiner

*Primary Examiner*—Mickey Yu
*Assistant Examiner*—Melissa L Lalli
(74) *Attorney, Agent, or Firm*—Hamre, Schumann, Mueller & Larson, P.C.

(57) ABSTRACT

A disc storage container for holding multiple discs comprising, a front container cover, a back container cover, and a spine, and attachment means on the spine, the front container cover and back container cover being moveable between a container open position enabling access to the contents of the container and a container closed position for storage purposes. A multi-tray assembly for retaining a plurality of discs within the container, the multi-tray assembly comprising two connectors and two trays for retaining and holding discs, each connector comprising a container-engaging member for engaging to the attachment means on the spine of the container and two holding means for rotatably holding a respective tray, so that each tray can be rotated about the holding means of the connectors to allow access to the discs retained by the trays when the container is in a container open position.

30 Claims, 11 Drawing Sheets

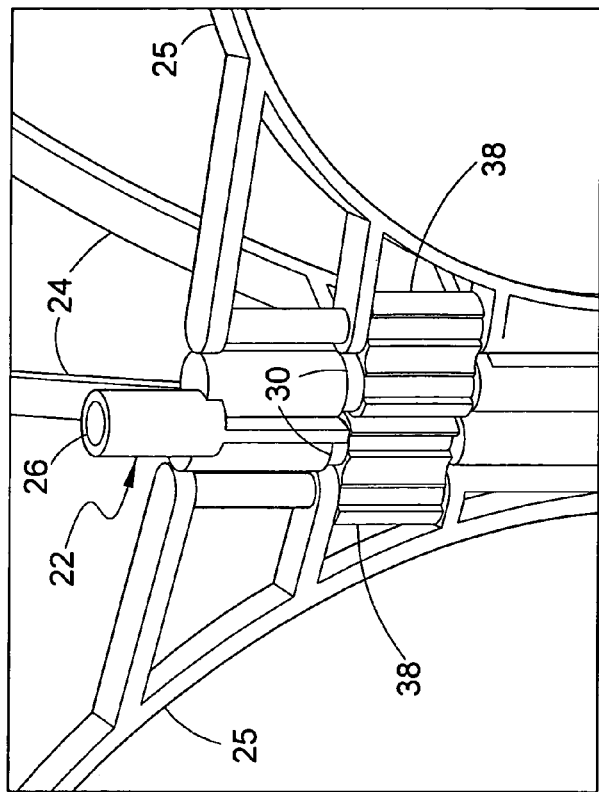
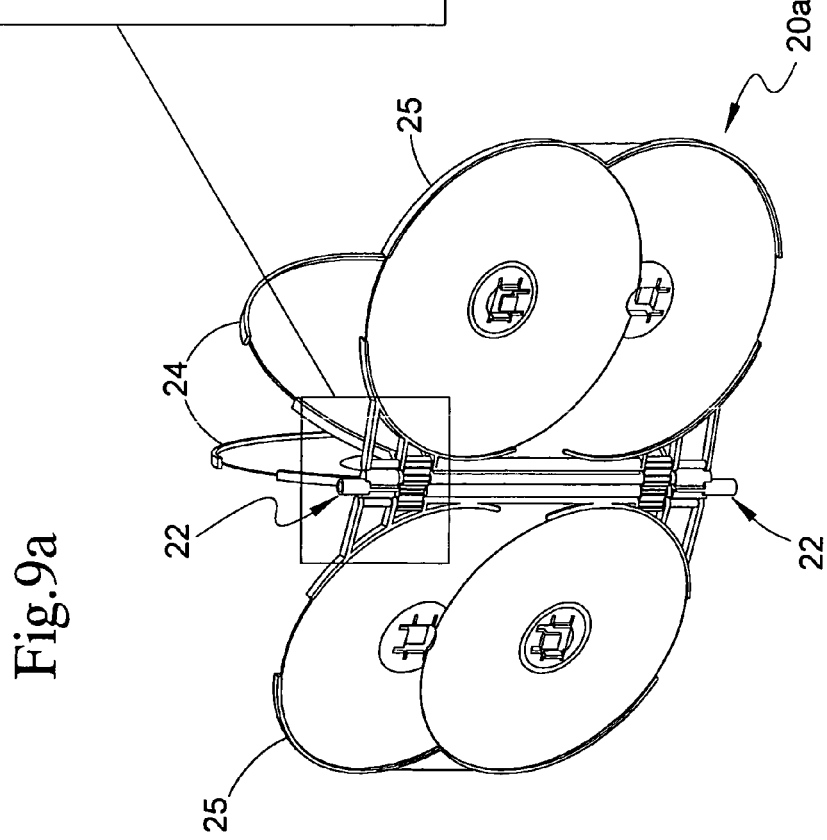
Fig.9b
Fig.9a

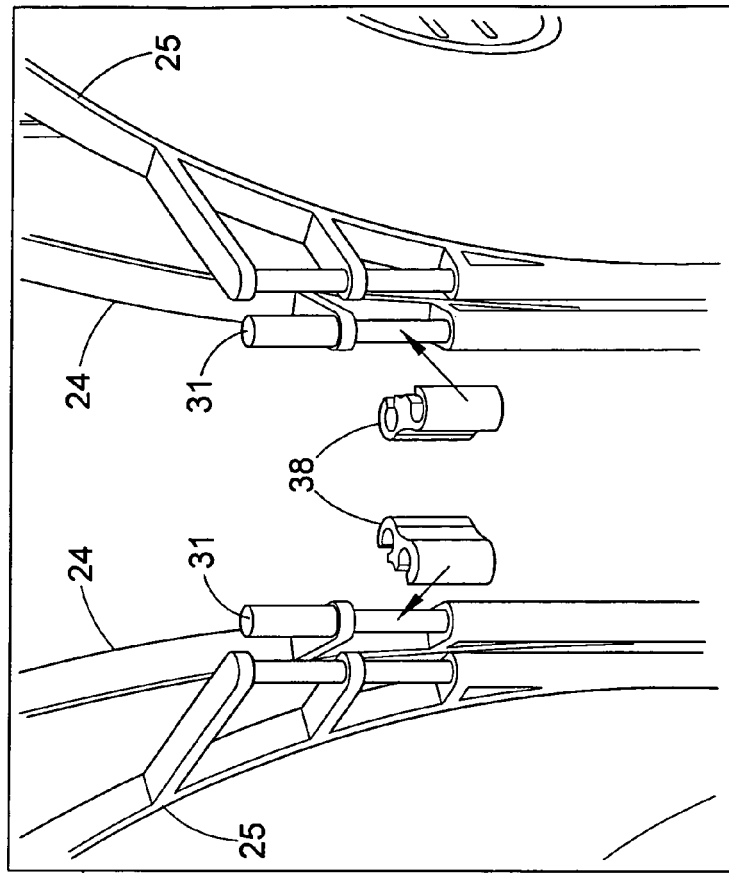
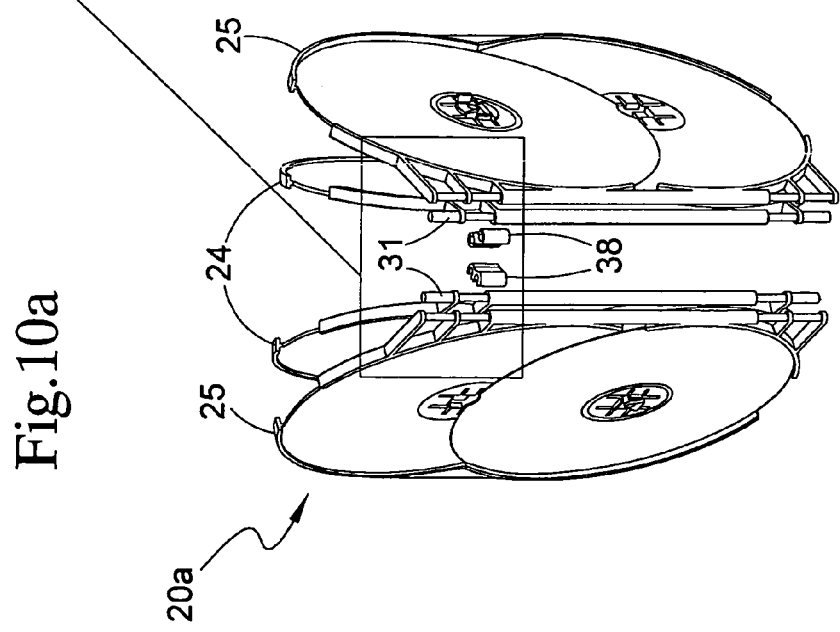
Fig.10b
Fig.10a

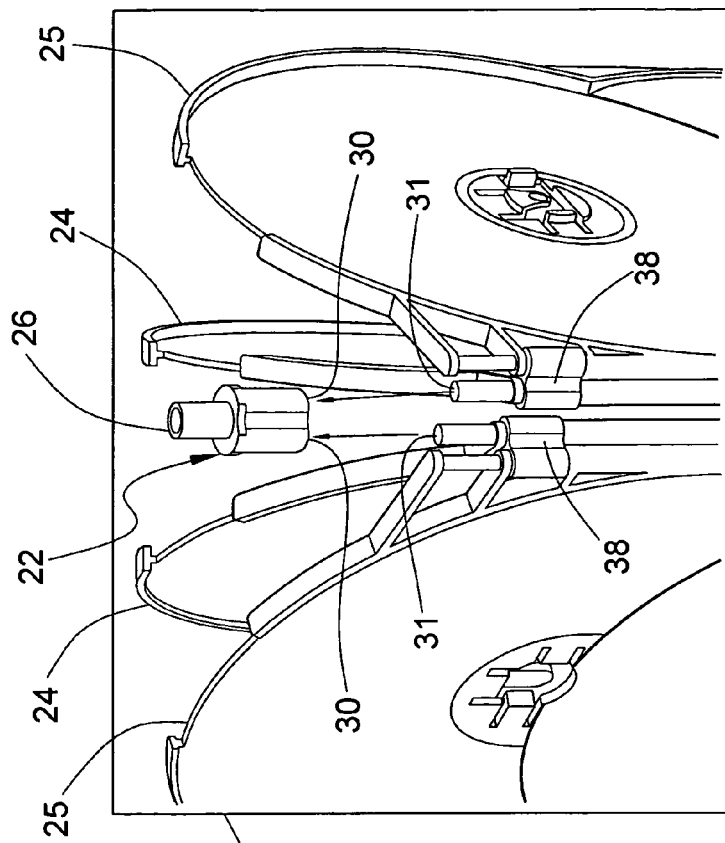
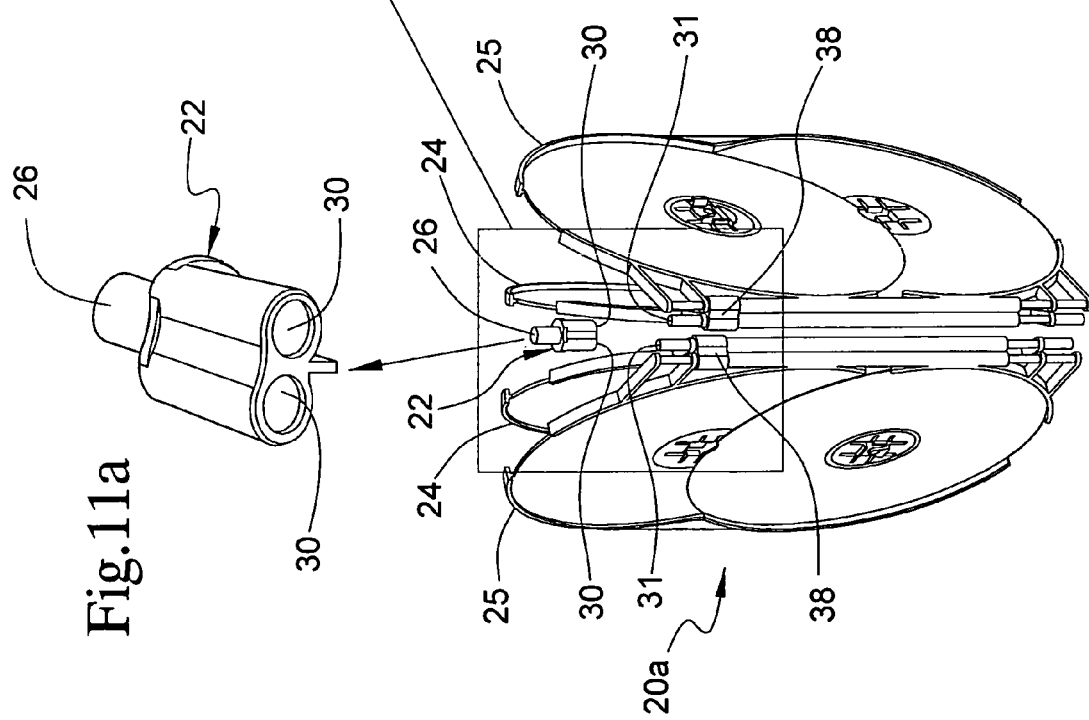
Fig.11a
Fig.11b

MULTIPLE DISC STORAGE CONTAINER

FIELD OF THE INVENTION

The present invention relates to disc storage containers and in particular to disc storage containers capable of holding multiple discs.

BACKGROUND OF THE INVENTION

Optical discs such CDs, VCDs and DVDs are currently the preferred medium for storing media for distribution to consumers. Numerous storage containers have been developed to hold these discs during shipping, display for sale, and subsequent home storage. Most existing storage containers are designed to hold only a single disc. Other storage containers are designed to hold multiple discs, however, these designs are generally a compromise between size and the number of discs. This is especially true for storage containers designed to hold more than two discs which require containers with significantly larger dimensions than the single disc storage containers.

In recent years a need has arisen to package multiple discs, more than one or two, in a single storage container. Various companies are now selling and packaging media products recorded on multiple CDs, VCDs and DVDs, and many products contain up to six or more discs. Some examples of multiple disc media products are musical "box sets" from particular artists or bands or unabridged audio books. Another example is computer software where new complex programs and computer games contain large amounts of data that require multiple discs for storage. A further example of such a product is a group of related movies such as sequels and prequels, or movies by a certain director or actor, or movies containing special features and bonus materials that require multiple DVDs. Also popular are TV series that are recorded on multiple DVDs due to their lengths.

With many new media products that require packaging of multiple media storage discs, there is a desire from manufacturers for a disc storage container that can hold multiple discs in a relatively compact space. In particular, many manufacturers desire that the thickness, length and width of a multiple disc storage container be substantially equal to the dimensions of a single disc storage container such as the thickness, length and width of the (industry standard) popular DVD storage container. Manufacturers also desire a container that may be easily configured to hold even or odd numbers of discs while providing space to store booklets in the storage container. Furthermore, there is also a desire to provide a storage container where it is possible to view the printed surfaces of all the individual discs without removing them from the trays of the storage container.

Most current solution is to increase the length or thickness of the conventional disc container to accommodate the additional disc or discs. This has proven unacceptable to both industry and the consumer. Any change in the storage container size would require that manufacturers warehouse multiple storage container sizes. Moreover, larger storage containers take up considerably more retail shelf space and accordingly reduce the available shelf inventory in retail stores. Consumers, like retailers, find that the larger size disc storage containers take up more space and are more difficult to store. As a result, there has been a growing consensus that there is a need for an improved multiple disc storage container that is based upon the dimensions of the conventional DVD storage containers in use today.

SUMMARY OF THE INVENTION

The present invention is directed to a storage container for holding multiple discs comprising, a front container cover and a back container cover, a spine disposed between the front container cover and back container cover, and attachment means at the opposite ends of the spine, the front container cover and back container cover being moveable between a container open position enabling access to the contents of the container and a container closed position for storage purposes, and a multi-tray assembly for retaining a plurality of discs within the container, the multi-tray assembly comprising two connectors and two trays for retaining and holding discs, each connector comprising a container-engaging member for engaging a respective attachment means on the spine of the container and at least two holding means for rotatably holding a respective tray, so that each tray can be rotated about the holding means of the connectors to allow access to the discs retained by the trays when the container is in a container open position.

Another aspect of this invention is a multi-tray assembly for retaining a plurality of discs within a storage container comprising two connectors and two trays, each connector comprising a container-engaging member for engaging a respective attachment means on a spine of the container and at least two holding means for rotatably holding a respective tray, so that each tray can be rotated about the holding means of the connectors to allow access to the discs retained by the trays when the container is in a container open position.

A further aspect of this invention is a multi-tray assembly for retaining a plurality of discs within a storage container comprising two connectors and a plurality of trays, each connector comprising a container-engaging member for engaging a respective attachment means on a spine of the container and a plurality of holding means for rotatably holding a respective tray, and a plurality of couplers for rotatably coupling trays held by the holding means and additional trays, so that each tray can be rotated independently to allow access to the discs retained by the trays when the container is in a container open position.

An additional aspect of this invention is a storage container for holding multiple discs, the container including at least two trays for retaining discs thereon, wherein the trays are mounted for rotation about respective axes parallel to each other and wherein the trays are connected together and to an inner surface of the container by means of a pair of connecting members located at respective ends of the trays.

A further additional aspect of this invention is a storage container for holding multiple discs, wherein the container is adapted to retain at least six discs in positions whereby a surface of each disc may be seen without requiring any other disc to be removed, and wherein the thickness of the container is substantially no larger than 16.0 mm.

Other features and advantages of the present invention will become apparent from the following detailed description. It should be understood, however, that the specific embodiments in the detailed description are given by way of illustration only, since various changes and modifications within the spirit and scope of the invention will become apparent to those skilled in the art from this detailed description.

BRIEF DESCRIPTION OF THE DRAWINGS

The invention will now be described, by way of example only, with reference to the following drawings, in which:

FIG. 9a is a perspective view of a multi-tray assembly made in accordance with an alternative embodiment of the present invention;

FIG. 9b is a partial perspective view of the multi-tray assembly shown in FIG. 9a;

FIG. 10a is a perspective view of the multi-tray assembly shown in FIG. 9a unassembled and without connectors;

FIG. 10b is a partial perspective view of the multi-tray assembly shown in FIG. 10a;

FIG. 11a is a perspective view of the multi-tray assembly shown in FIG. 9a partially assembled with connectors detached; and FIG. 11b is a partial perspective view of the multi-tray assembly shown in FIG. 11a.

DETAILED DESCRIPTION OF THE INVENTION

As used herein, the term disc is defined to include any compact disc (CD), video compact disc (VCD), digital versatile disc (DVD), as well as any other media storage disc, optical disc or similar device used for storing information. The preferred embodiment of the present invention is designed to hold the standard 12 cm diameter disc, however, the present invention can be adapted for 8 cm diameter discs or discs of smaller or larger diameters.

Figure 1:
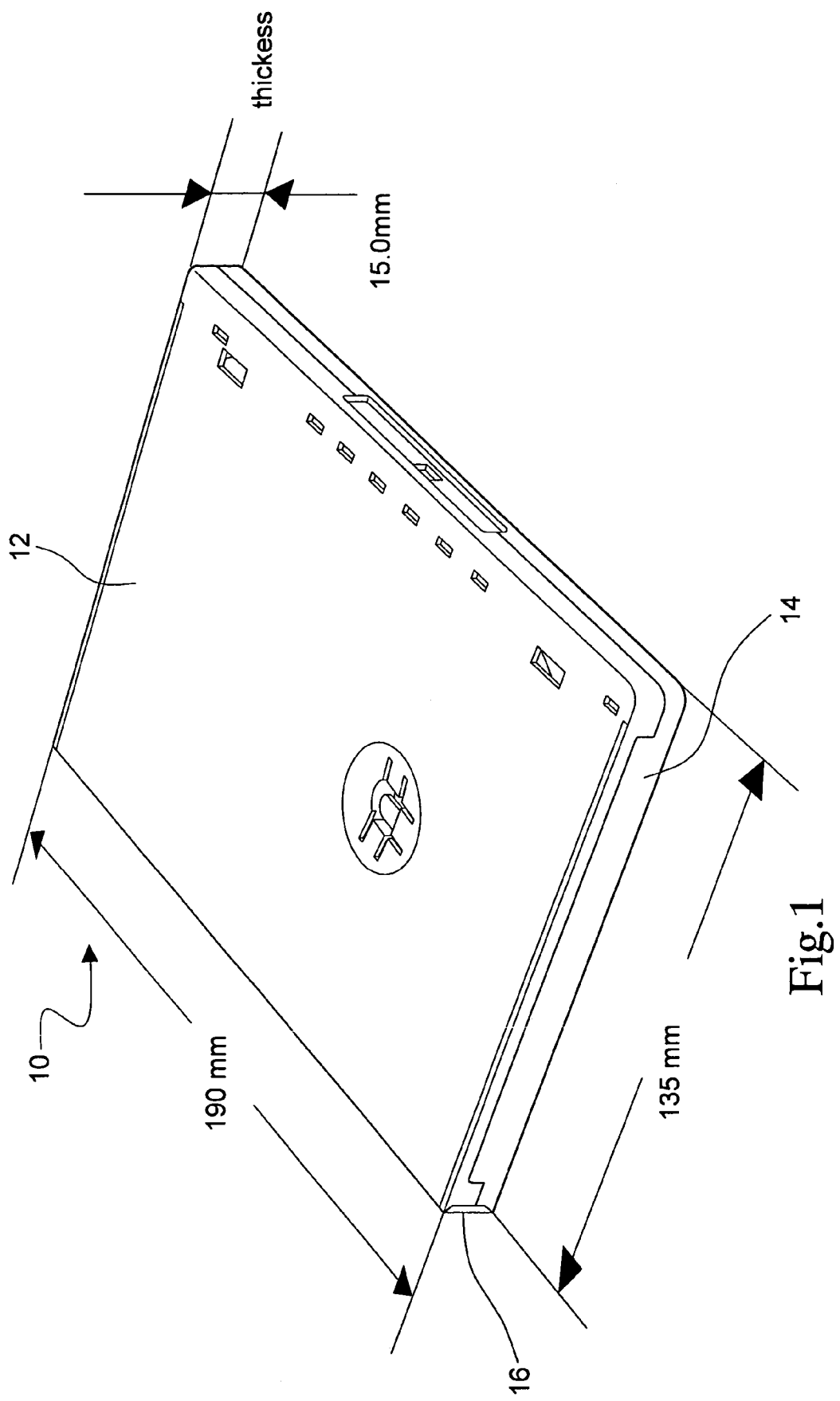
FIG. 1 is a perspective view of a storage container made in accordance with a preferred embodiment of the present invention with the storage container in a container closed position.
Figure 2:
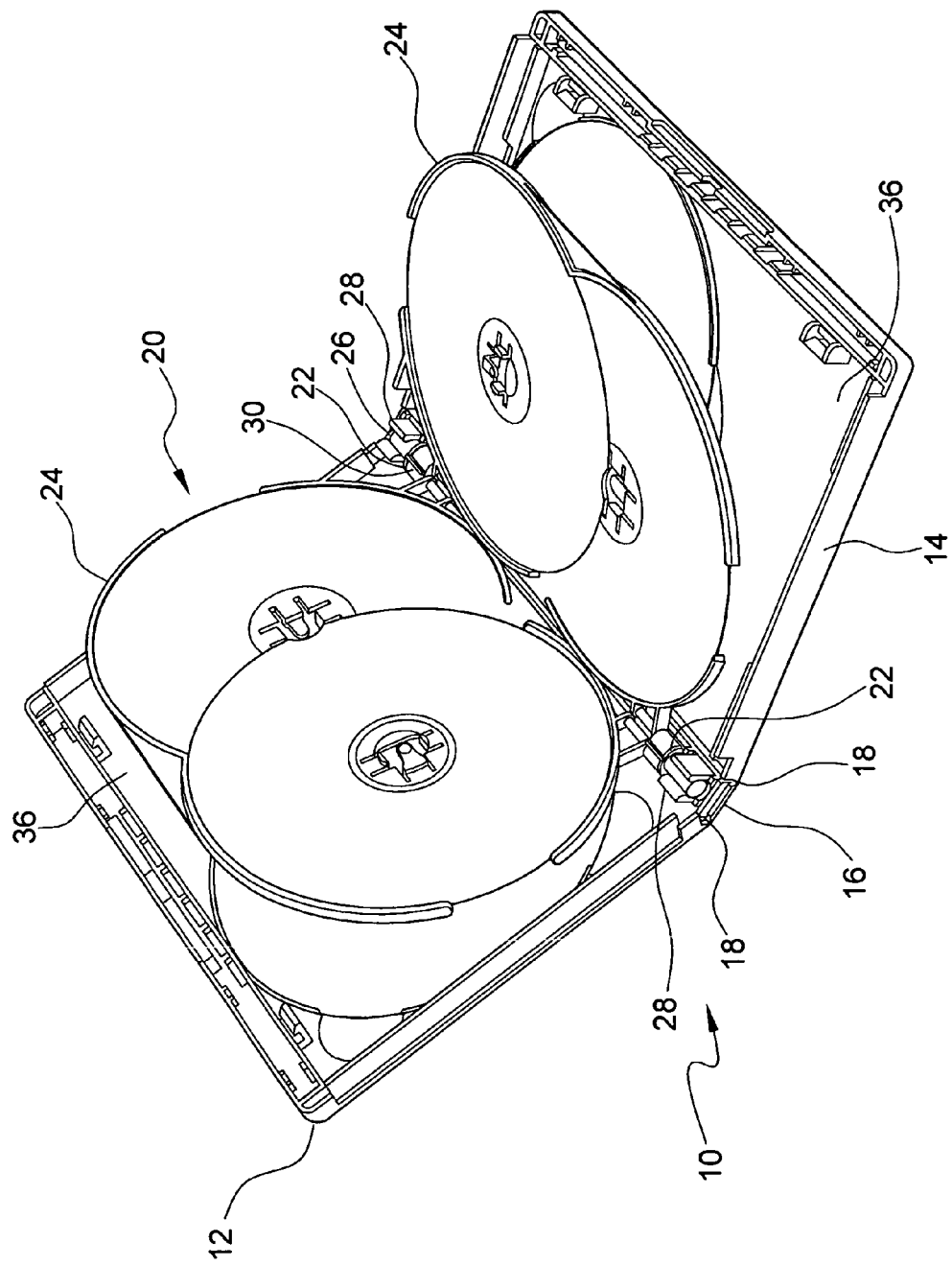
FIG. 2 is a perspective view of the storage container shown in FIG. 1 with the storage container in a container open position and showing a multi-tray assembly.

Referring now to FIGS. 1 and 2, illustrated therein is a storage container 10 made in accordance with a preferred embodiment of the present invention. The storage container 10 may generally be defined by a unitarily formed plastic body comprising a front container cover 12, a back container cover 14 and a spine 16 disposed between the front container cover 12 and the back container cover 14. Preferably, the edge between front container cover 12 and the spine 16 define a hinge 18 and the edge between the back container cover 14 and the spine 16 define another hinge 18. In the preferred embodiment hinges 18 are living hinges wherein the edges between the container covers and the spine of the unitary plastic body have reduced wall thickness to provide a region about which the container covers can rotate. In other embodiments, different materials, hinges and separate container covers and spines may be used.

Figure 3:
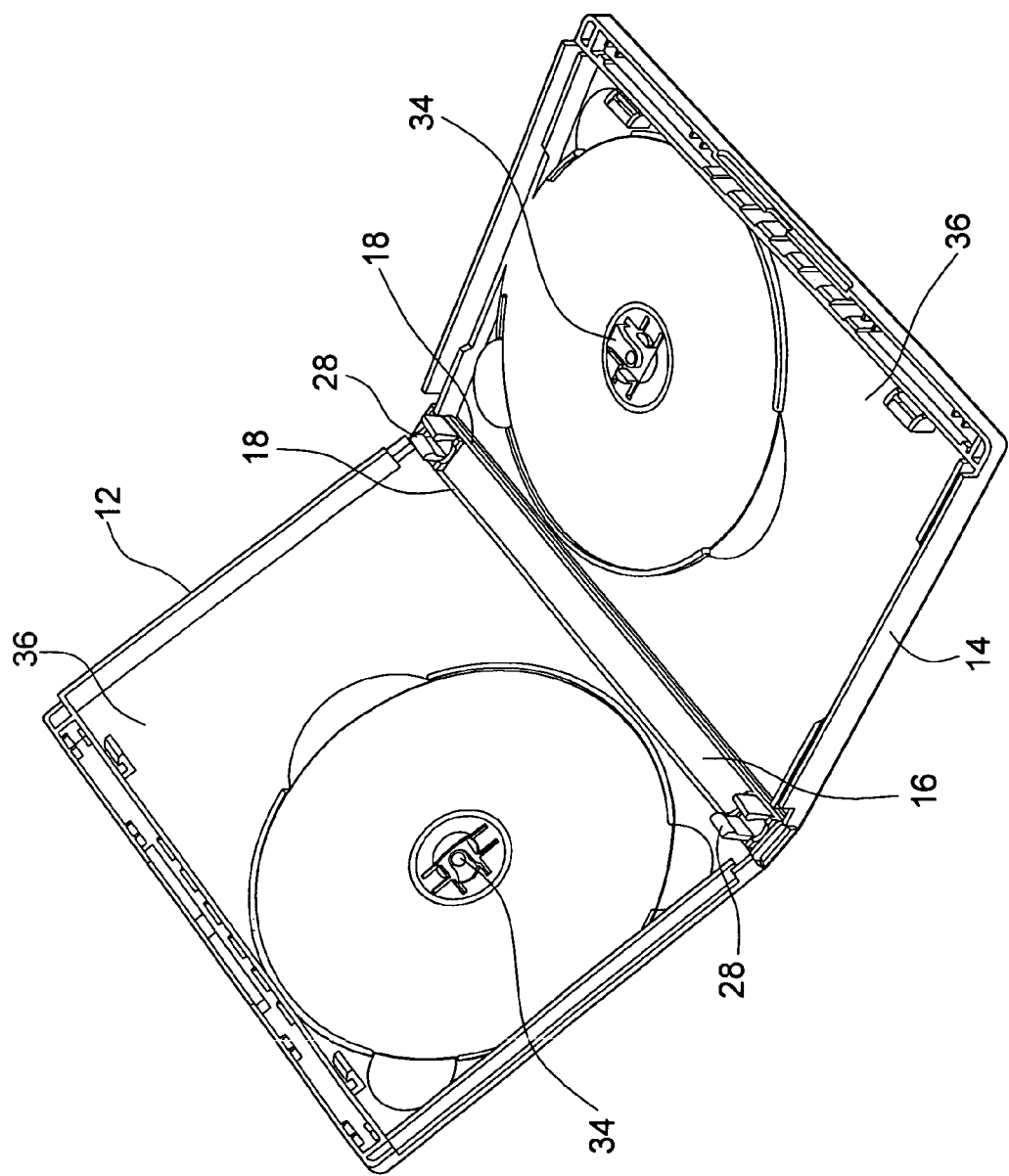
FIG. 3 is a perspective view of the storage container shown in FIG. 1 with the storage container covers in a container open position and without the multi-tray assembly.

FIG. 1 illustrates a storage container 10 in a container closed position while FIGS. 2 and 3 illustrate a storage container 10 in a container open position. Hinges 18 enable the storage container covers to move between container closed and container open positions. When the storage container 10 is in a container closed position, it is suitable for storage, transportation and display in retail settings. When the storage container 10 is in a container open position, its contents may be accessed.

FIG. 2 illustrates a storage container 10 in container open position with an attached multi-tray assembly 20 for retaining a plurality of discs within the storage container 10.

Figure 4:
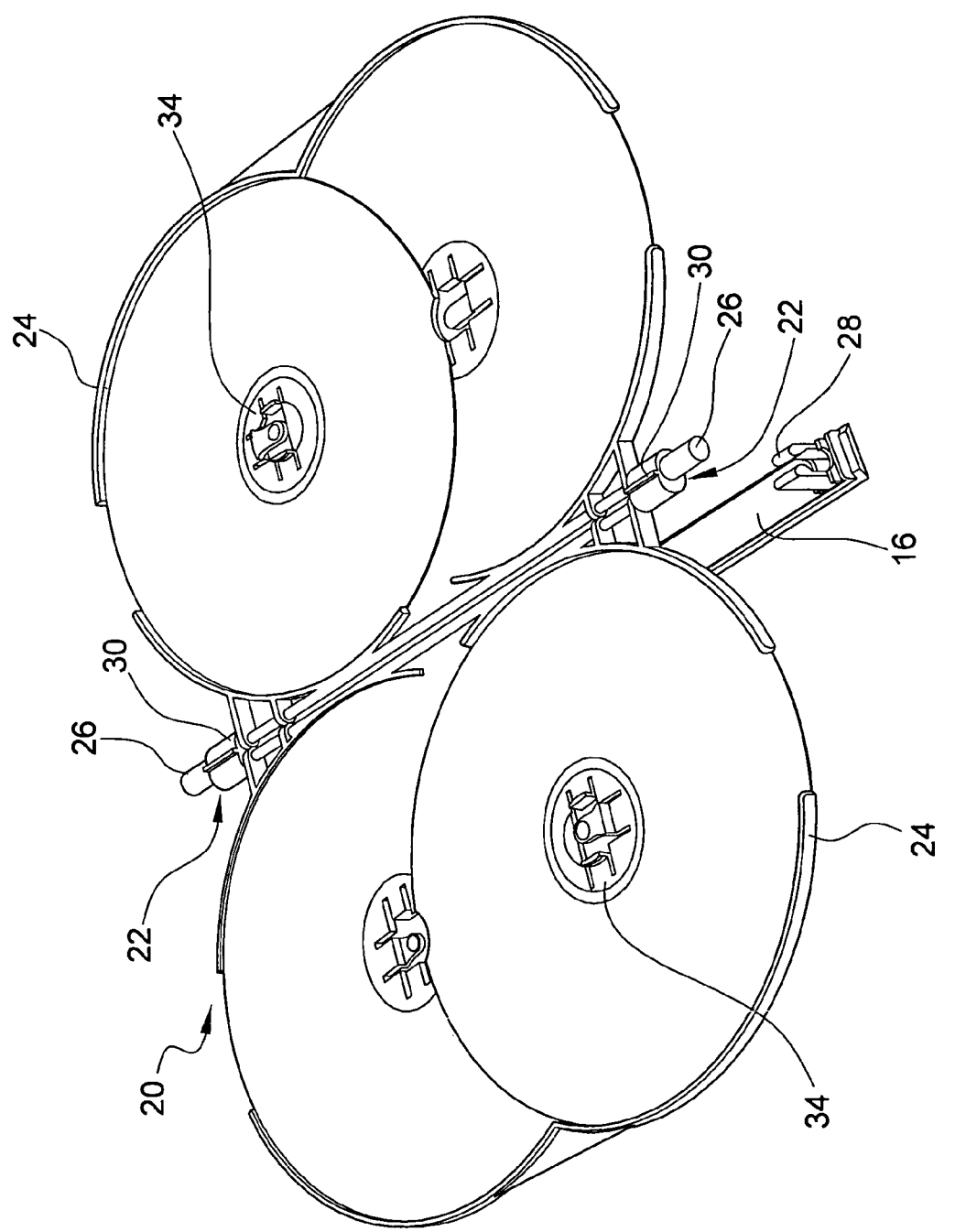
FIG. 4 is a perspective view of a multi-tray assembly made in accordance with a preferred embodiment of the present invention shown with a spine.
Figure 5:
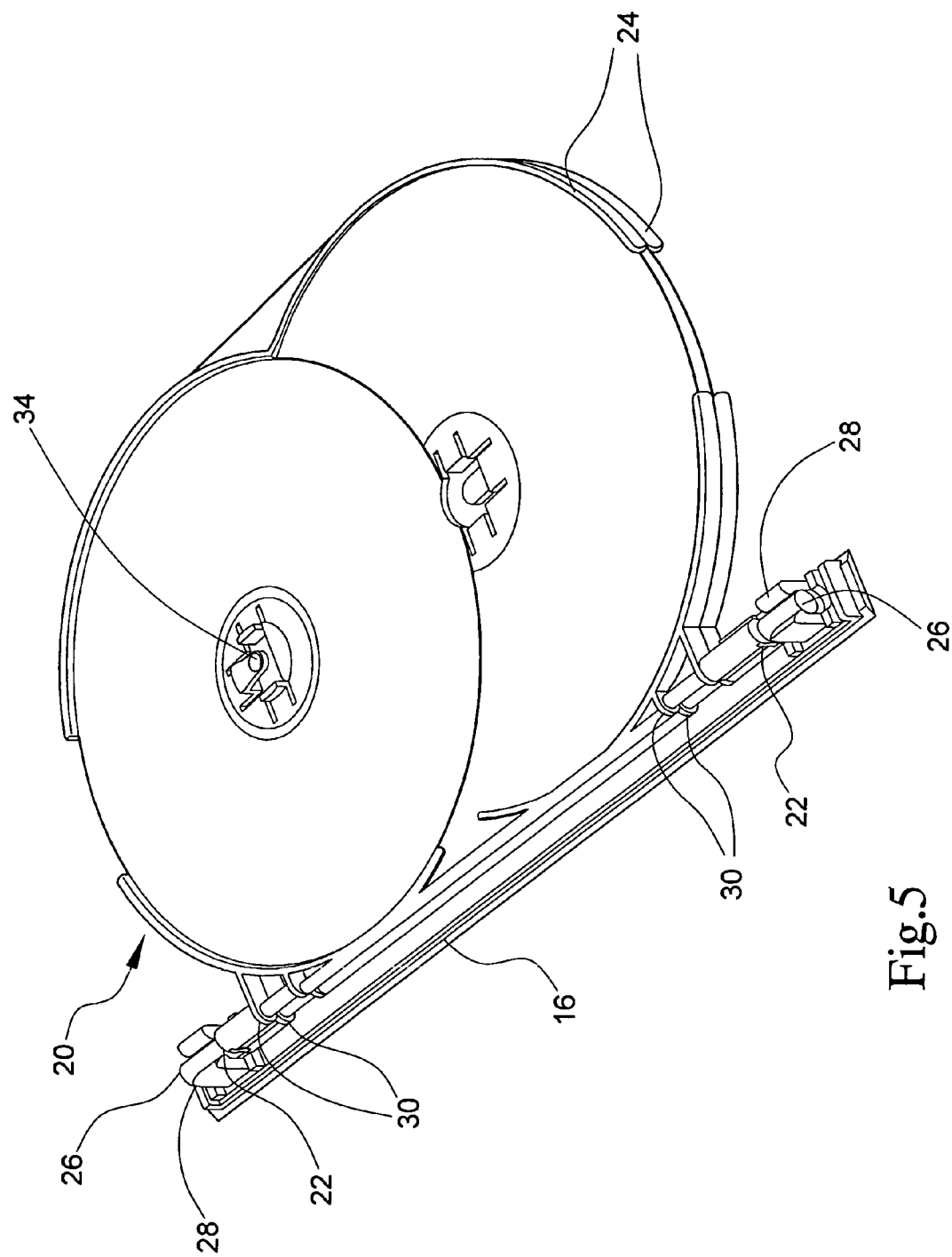
FIG. 5 is a perspective view of the multi-tray assembly shown in FIG. 4 attached to the spine.
Figure 6:
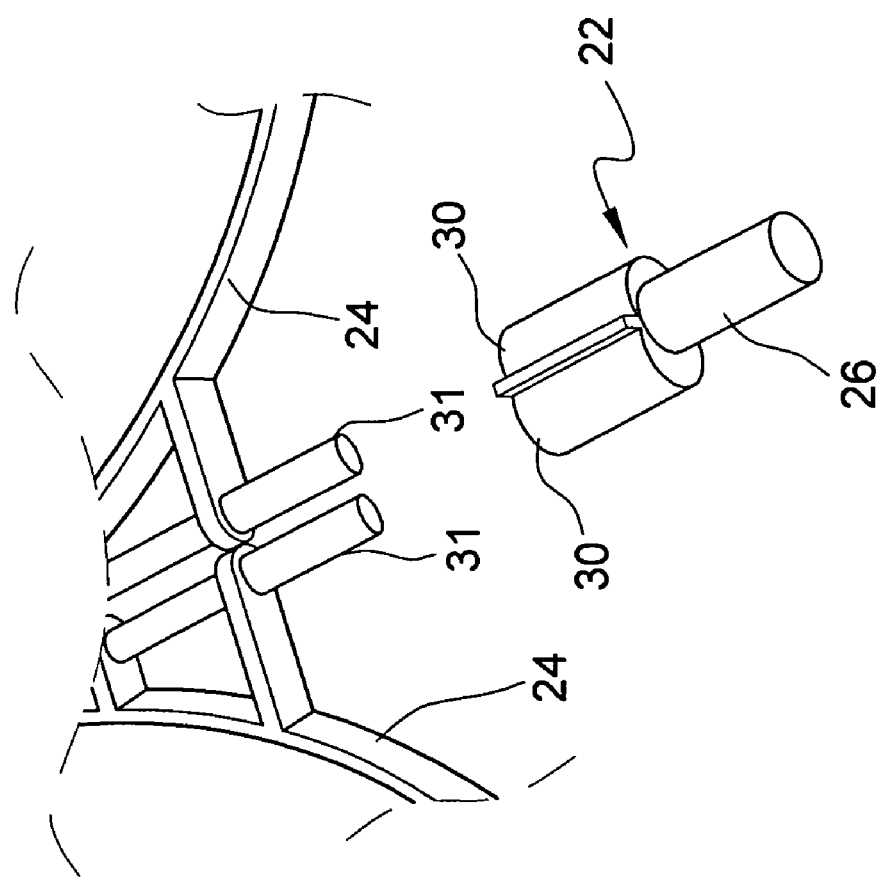
FIG. 6 is a partial exploded view of the multi-tray assembly shown in FIG. 4.

The multi-tray assembly 20 is also illustrated in FIGS. 4, 5 and 6. In FIG. 4 the multi-tray assembly 20 is shown detached from the spine 16 while in FIG. 5, the multi-tray assembly 20 is shown attached to attachment means 28 of the spine 16 of the storage container 10. In the preferred embodiment, the multi-tray assembly 20 comprises two connectors 22, and two trays 24. Each of the connectors 22 comprises a container-engaging member 26 for engaging a respective attachment means 28 and a pair of integrally formed holding means 30 for rotatably holding a respective tray 24. Thus, the trays 24 are connected together and to an inner surface of the storage container 10 by means of a pair of connectors 22 located at respective ends of the trays 24.

In a preferred embodiment of the storage container 10 the attachment means 28 on the spine 16 are clips and the container-engaging members 26 are shafts to provide a snap fit between the container-engaging members 26 and the attachment means 28.

As illustrated in FIGS. 4, 5 and 6, the trays 24 are rotatably fitted on to the holding means 30 of the connectors 22 enabling the trays 24 to rotate independently of each other about the holding means 30 to allow access to the discs retained by the trays 24. Preferably the holding means 30 of the connector 22 is a hole and each tray 24 has extending pins 31 that rotatably fit into the holes to provide a rotational fit between the holding means 30 and the tray 24. Thus, the trays 24 are mounted for rotation about respective axes parallel to each other.

In FIG. 4 the two trays 24 are rotated so that they are in an open position to allow access to the discs retained by the trays 24 when the storage container 10 is in a container open position as shown in FIG. 2. In FIG. 5, the two trays 24 are rotated so that they are in a stacked position which allows the multi-tray assembly 22 to fit within the storage container 10 when the storage container 10 is in a container closed position as shown in FIG. 1. As can be seen in FIGS. 4 and 5, the trays 24 can rotate throughout a range (typically 180°) sufficient to access the discs like the pages of a book.

Figure 7:
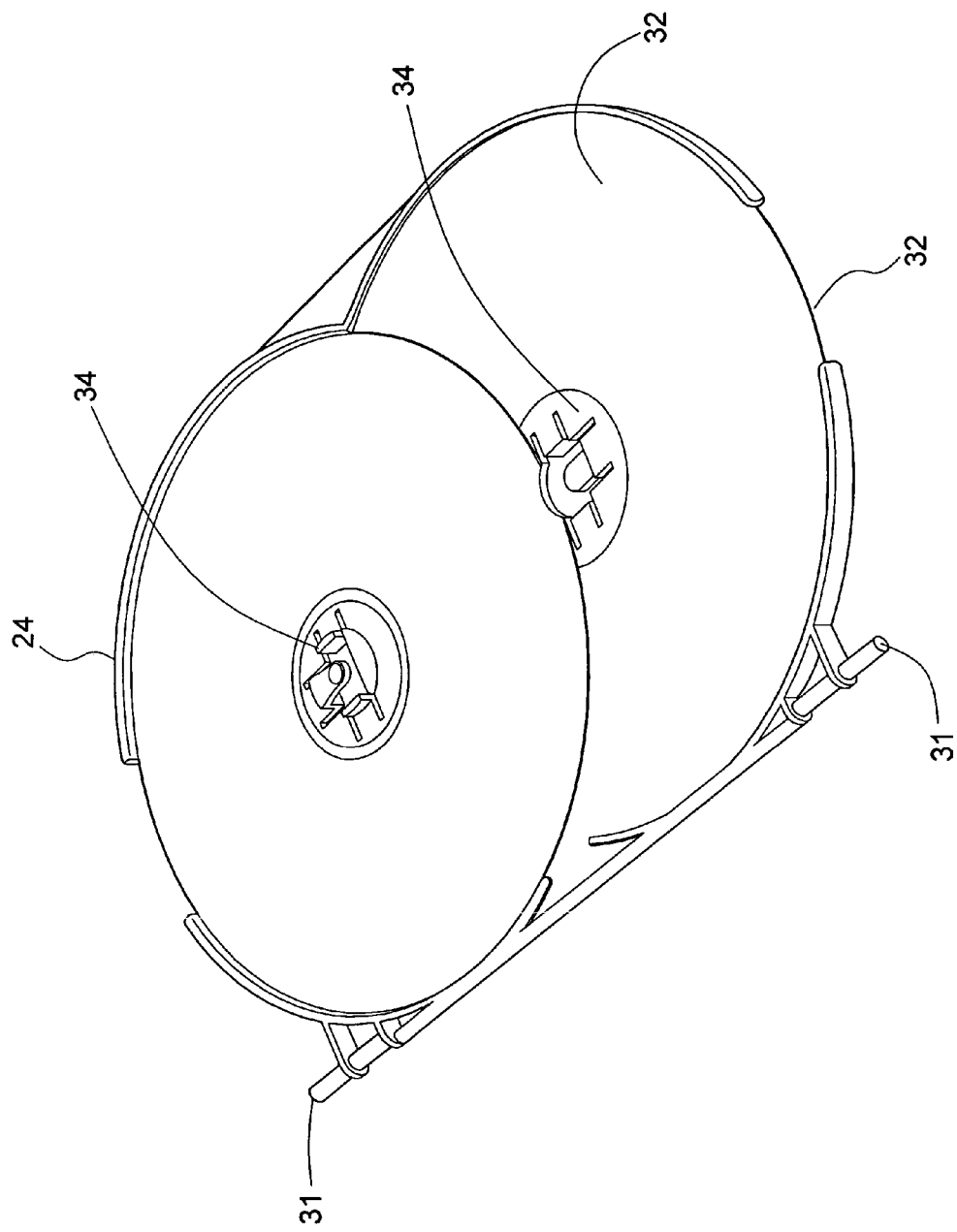
FIG. 7 is a perspective view of a tray made in accordance with a preferred embodiment of the present invention.

FIG. 7 illustrates a tray 24 made in accordance with a preferred embodiment of the present invention. The tray 24 has two planar surfaces 32 and preferably a disk engagement means 34 on each planar surface of the tray 24 for retaining and holding a disc. The trays 24 are in the shape of two overlapping circles thus reducing the surface area required to hold more than one disc on a tray. In the preferred embodiment, each disc is retained and held in a respective circle on opposite planar surfaces of the tray, in this fashion, the printed surfaces of both discs are visible without having to remove any of the discs from the tray. Furthermore, each disc is accessible to be removed individually without having to remove any other discs. In different embodiments of this invention and depending on the capacity required for the particular configuration of the storage container there maybe more than one disc engagement means on each planar surface of the tray, or alternatively it is also possible to have configurations where there is only one disc engagement means per tray.

Referring now back to FIG. 3, in the preferred embodiment the present invention, inside surfaces 36 of both the front container cover 12 and the back container cover 14 have disc engagement means for retaining and holding a further disc. In different embodiments it could be possible that there is a disc engagement means only on one of the container covers or none at all depending on the configuration and capacity requirement of the storage container. In alternative embodiments of the present invention, the inside surfaces 36 of the front container cover 12 and the back container cover 14 may have literature clips (not shown) configured to hold literature booklets in the container cover for information relating to the discs as may be desirable in different media products. It other embodiments of the storage container the inside container covers may contain both literature clips and disc engagement means.

There are numerous different types of disc engagement means known in the art for retaining and holding discs. In the preferred embodiment of this invention, the disc engagement means 34 is an extending rosette for engaging a center hole of a disc. It is also possible to use disc engagement means other than ones that engage a center hole of a disc such as engagement means that clamp on to the edges of a disc. Other design features can also be added to the tray without departure from the invention such as lips around the tray or depressions in the shape of a disc to help retain the disc in place or finger holes in the trays for allowing the user to grasp outer edges of the disc for removal from the rosette.

In the preferred embodiment of the present invention, the dimensions of storage container 10 in the container closed position is that of the industry standard DVD storage container with thickness, width, length dimensions of substantially 15.0 mm, 135 mm, and 190 mm. Of these dimensions, the most important is the thickness. Height and width may be allowed to vary but it is preferable to keep the thickness at approximately the nominal 15.0 mm, though allowing for manufacturing tolerances this thickness may be increased to 16.0 mm. In this embodiment, the invention advantageously provides a storage container with the capacity to hold six discs in the size of an industry standard DVD storage container, with disc engagement means on the inside surfaces of the front container cover 12 and back container cover 14, and with two trays 24 each tray having a disc engagement means 34 on both planar surfaces 32 to hold two discs on each tray 24. A further advantage of this embodiment is that the printed surface of each disc may be seen without requiring any other disc to be removed.

Figure 8:
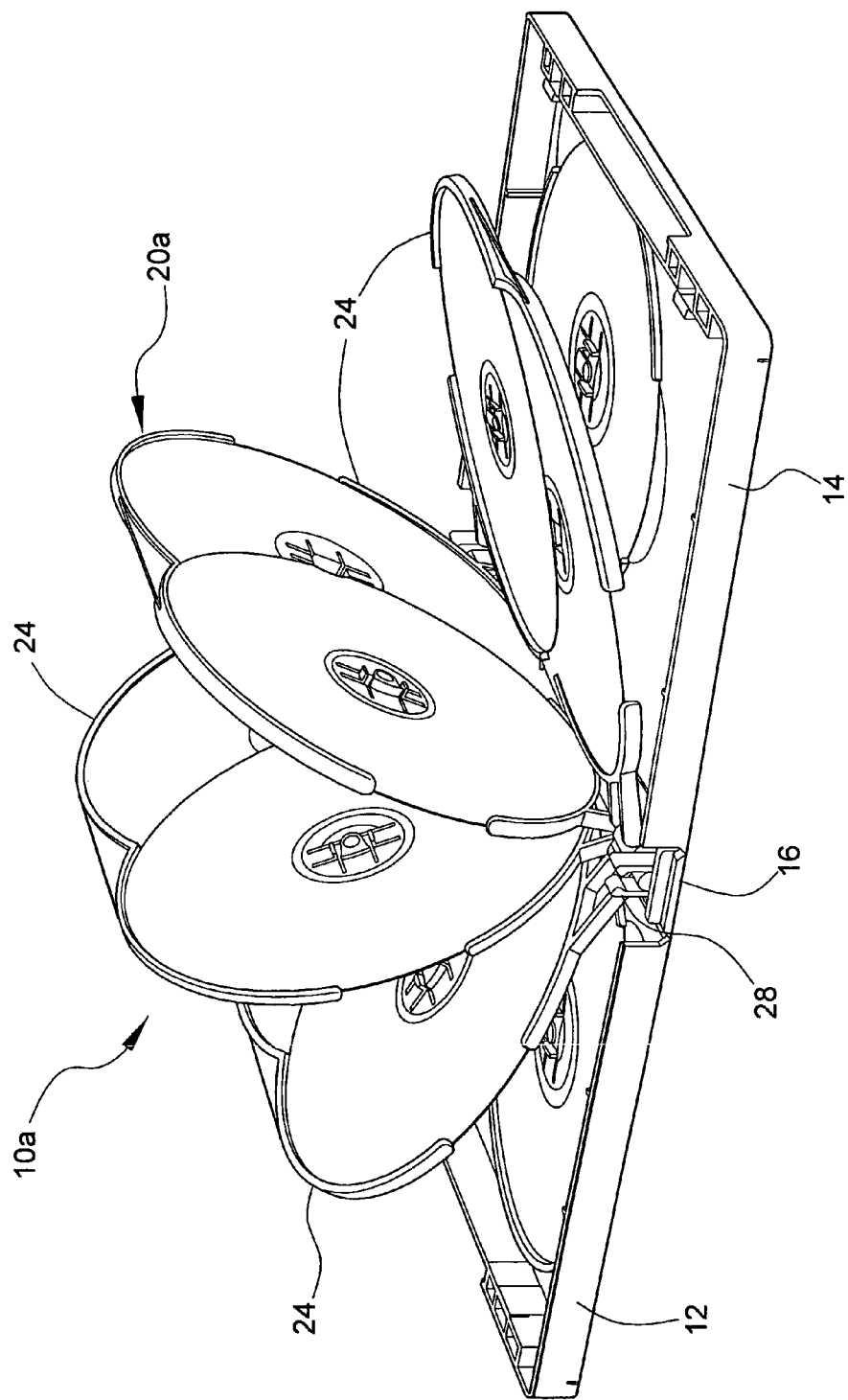
FIG. 8 is a perspective view of a storage container made in accordance with an alternative embodiment of the present invention with the container covers in container open position showing a multi-tray assembly.

In alternative embodiments of the present invention, the multi-tray assembly can be adapted to hold more than two trays. In FIG. 8, in a perspective view, an alternative embodiment of storage container 10a is shown in a container open position with a four tray multi-tray assembly 20a. In this particular embodiment, the storage container 10a has the capacity to hold up to ten discs.

FIGS. 9a, 9b, 10a, 10b, 11a, and 11b illustrate an alternative embodiment of a multi-tray assembly 20a with four trays. The multi-tray assembly 20a comprises two connectors 22, two couplers 38, two trays 24 and two additional trays 25, each connector 22 comprising a container-engaging member 26 for engaging a respective attachment means 28 on the spine 16 of the container and at least two integrally formed holding means 30 for rotatably holding two respective trays 24 (shown in detail in FIGS. 11a and 11b), and at least two couplers 38 for rotatably coupling the two additional trays 25 to the trays 24 held by the holding means 30 (shown in detail in FIGS. 10a and 10b), so that the two trays 24 can be rotated about the holding means 30 of the connectors 22 and the two additional trays 25 can be rotated about the couplers 38, to allow access to the discs retained by the trays when the storage container 10a is in a container open position. Couplers 38 are capable of rotatably coupling two trays so that each tray can independently rotate with respect to each other. And as illustrated in FIGS. 10b and 11b, the couplers 38 are preferably of the type that can snap fit onto the extending pins of the trays permitting easy assembly.

In other embodiments, the multi-tray assembly may be adapted to receive more trays and thus increase the capacity to hold more discs. Accordingly, storage containers for larger capacity multi-tray assemblies may need to have correspondingly larger dimensions to accommodate larger multi-tray assemblies.

It should therefore be apparent to one skilled in the art that various modifications can be made to the embodiments disclosed herein, without departure from the invention, the scope of which is defined in the appended claims.

The invention claimed is:

1. A storage container for holding multiple discs, comprising:
   a front container cover;
   a back container cover, the front container cover and the back container cover being moveable between a container open position enabling access to contents of the container and a container closed position for storage purposes;
   a spine disposed between the front container cover and the back container cover;
   an attachment means positioned at each of opposite ends of the spine, and
   a multi-tray assembly for retaining a plurality of discs within the container, the multi-tray assembly comprising:
   two connectors; and
   two trays for retaining and holding discs,
   each connector comprising a container-engaging member for rotatably engaging with a respective attachment means on the spine of the container and at least two holding members each for rotatably holding an extending member positioned at a side of a respective tray, so that each tray is pivotable about a respective holding member and each holding member is rotatable relative to the attachment means on the spine to allow access to the discs retained by the trays when the container is in the container open position, and to allow both trays together to be positioned flatly against one of the covers when the container is in the container open position and the covers are positioned to lay flat on a level surface.

2. The storage container as defined in claim 1, further comprising two additional trays and two couplers, wherein the couplers rotatably couple the trays held by the holding members and the additional trays, so that each tray can be rotated independently to allow access to the discs retained by the trays when the container is in a container open position.

3. The storage container as defined in claim 1, wherein a thickness of exterior dimensions of the container in the container closed position is no larger than substantially 16.0 mm, the container being adapted to retain at least six discs, wherein placement and removal of each disc do not interfere with retainment of the other discs.

4. The storage container as defined in claim 1, wherein each tray has two planar surfaces with at least one disc engagement member on each tray for retaining and holding a disc.

5. The storage container as defined in claim 1, wherein each tray has two planar surfaces with at least one disc engagement member on each planar surface for retaining and holding a disc.

6. The storage container as defined in claim 1, wherein each holding member includes a hole and each tray has two extending pins that rotatably fit into respective holes to provide a rotational fit between the holding members and the tray whereby the tray may rotate about an axis defined by the pins.

7. The storage container as defined in claim 1, wherein the attachment means of the spine are clips and the container-engaging members are shafts to provide a snap fit between the container-engaging members and the attachment means.

8. The storage container as defined in claim 1, further comprising at least one disc engagement member disposed on the inside surface of the front container cover for retaining and holding a disc.

9. The storage container as defined in claim 1, further comprising at least one disc engagement member disposed on the inside surface of the back container cover for retaining and holding a disc.

10. The storage container as defined in claim 4, wherein each disc engagement member is an extending rosette for engaging a center hole of a disc.

11. The storage container as defined in claim 1, wherein an edge between the front container cover and the spine defines a hinge.

12. The storage container as defined in claim 1, wherein an edge between the back container cover and the spine defines a hinge.

13. The storage container as defined in claim 11, wherein the hinge is a living hinge.

14. The storage container as defined in claim 1, further comprising literature clips disposed on the inside surface of the front container cover configured to hold literature booklets in the front container cover.

15. The storage container as defined in claim 1, further comprising literature clips disposed on the inside surface of the back container cover configured to hold literature booklets in the back container cover.

16. The storage container as defined in claim 1, wherein the container is adapted to retain at least six discs in positions whereby a surface of each disc is seen without requiring any other disc to be removed, and wherein thickness of the container is substantially no larger than 16.0 mm.

17. The storage container as defined in claim 1, wherein a thickness of the container is substantially no larger than 15.0 mm.

18. The storage container as defined in claim 1, wherein dimensions of the container are substantially no larger than 15.0 mm by 135 mm by 190 mm.

19. A multi-tray assembly for retaining a plurality of discs within a storage container, comprising:
a spine having two spaced apart attachment means disposed thereon, the spine having a lateral side;
a container cover pivotally connected to the lateral side of the spine;
two trays; and
two connectors adapted to pivotally connect the trays to the spine via the attachment means,
each connector comprising a container-engaging member for rotatably engaging a respective attachment means and at least two holding members each for rotatably holding an extending member positioned at a side of a respective tray, so that each tray is pivotable about a respective holding member and each holding member is rotatable relative to the attachment means to allow both trays together to be positioned flatly against the container cover when the container cover and the spine are positioned to lay flat on a level surface.

20. The multi-tray assembly as defined in claim 19, wherein each tray has two planar surfaces with at least one disc engagement member on each tray for retaining and holding a disc.

21. The multi-tray assembly as defined in claim 19, wherein each tray has two planar surfaces with at least one disc engagement member on each planar surface for retaining and holding a disc.

22. The multi-tray as defined in claim 20, wherein each disc engagement member is an extending rosette for engaging a center hole of a disc.

23. The multi-tray as defined in claim 19, wherein each holding member includes a hole and each tray having extending pins that rotatably fit into respective holes to provide a rotational fit between the holding members and the tray whereby the tray may rotate about an axis defined by the pins.

24. The multi-tray as defined in claim 21, wherein each disc engagement member is an extending rosette for engaging a center hole of a disc.

25. A multi-tray assembly for retaining a plurality of discs within a storage container, comprising:
a spine having two spaced apart attachment means disposed thereon, the spine having a lateral side;
a container cover pivotally connected to the lateral side of the spine;
at least two trays; and
two connectors adapted to pivotally connect the trays to the spine via the attachment means,
each connector comprising a container-engaging member for engaging with a respective attachment means and at least two holding members each for rotatably holding a side of a respective tray, and a plurality of couplers for rotatably coupling additional trays with trays held by the holding members so that each tray is pivotable independently to allow access to discs retained by the trays when the container is in a container open position, and to allow at least two adjacent trays to be positioned flatly against the container cover when the container is in the container open position and the container cover and the spine are positioned to lay flat on a level surface.

26. The multi-tray assembly as defined in claim 25, wherein each tray has two planar surfaces with at least one disc engagement member on each tray for retaining and holding a disc.

27. The multi-tray assembly as defined in claim 25, wherein each tray has two planar surfaces with at least one disc engagement member on each planar surface for retaining and holding a disc.

28. The multi-tray as defined in claim 26, wherein each disc engagement member is an extending rosette for engaging a center hole of a disc.

29. The multi-tray as defined in claim 27, wherein each disc engagement member is an extending rosette for engaging a center hole of a disc.

30. The multi-tray as defined in claim 25, wherein each holding member includes a hole and each tray having extending pins that rotatably fit into respective holes to provide a rotational fit between the holding members and the tray whereby the tray may rotate about an axis defined by the pins.

* * * * *